United States Patent Office.

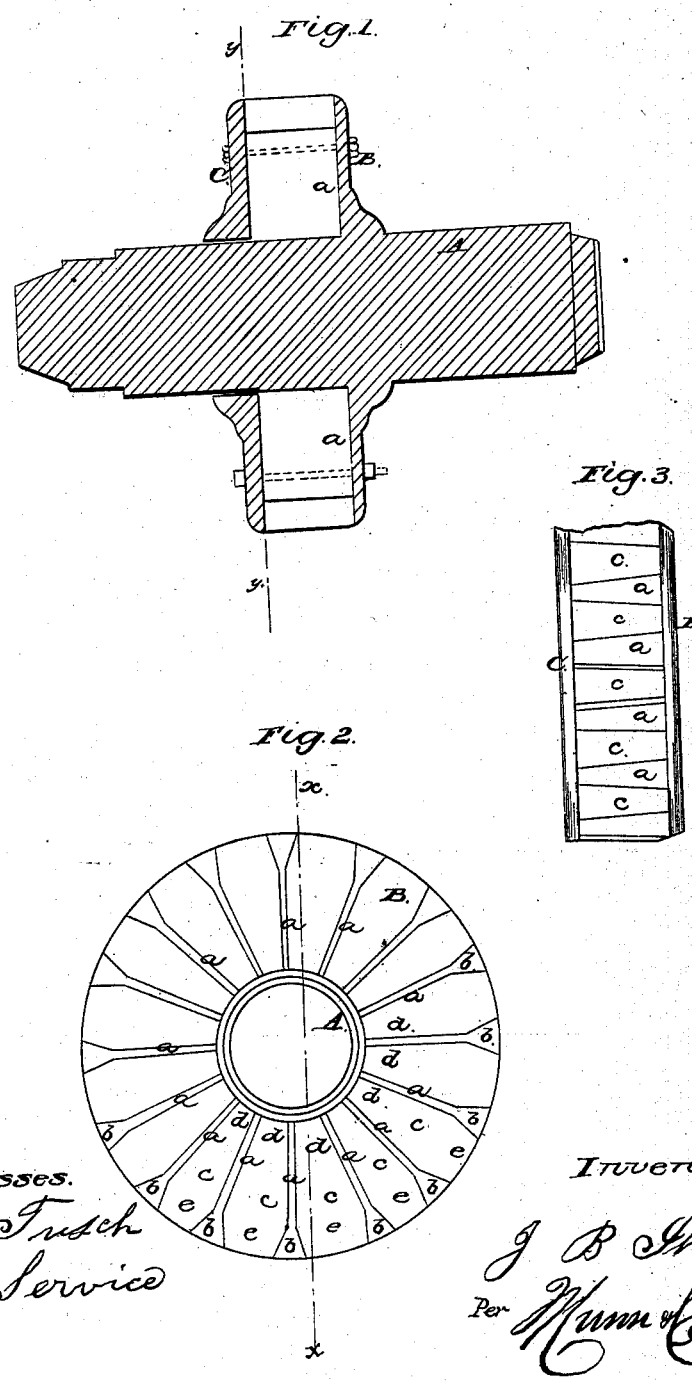

JAMES B. STUART, OF BUNKER HILL, ILLINOIS.

*Letters Patent No. 62,161, dated February 19, 1867.*

---

IMPROVEMENT IN METALLIC HUBS FOR THE WHEELS OF VEHICLES

---

*The Schedule referred to in these Letters Patent and making part of the same.*

---

TO ALL WHOM IT MAY CONCERN:

Be it known that I, JAMES B. STUART, of Bunker Hill, in the county of Macoupin, and State of Illinois, have invented a new and useful Improvement in Metallic Hubs for the Wheels of Vehicles; and I do hereby declare that the following is a full clear, and exact description thereof, which will enable others skilled in the art to make and use the same, reference being had to the accompanying drawings, forming part of this specification, in which—

Figure 1 is a longitudinal vertical section of my invention taken in the line $x\ x$, fig. 1.

Figure 2, a transverse section of the same taken in the line $y\ y$, fig. 1.

Figure 3, a side view of a portion of the same.

Similar letters of reference indicate like parts.

This invention relates to a new and useful improvement in metallic hubs for the wheels of vehicles, and it consists in a novel manner of securing the spokes in the hub, as hereinafter fully shown and described, whereby the spokes are firmly retained in position and rendered capable of being readily detached and replaced by new ones whenever required.

A represents the hub of a wheel which is cast with a circular plate or collar, B, having lateral flanges or projections $a$, between which the spokes are fitted. The flanges or projections $a$ have radial sides for the greater portion of their length, the outer parts of the sides being considerably inclined so as to be of V-form, as shown at $b$, fig. 2. The inner ends or tenons of the spokes are fitted in the spaces $c$, between the flanges or projections $a$, the inner parts, $d$, of said spaces gradually increasing in width from their lower ends up to the flaring parts $b$ of the flanges, where they commence to diminish in width to their outer ends, as shown at $e$. These spaces, in consequence of being of the form described, prevent the spokes from working in a direction radial with the hub, that is, inward or outward from the same, and the spaces are not of the same width throughout their entire length, but gradually diminish in width from their open ends to the collar B, as shown clearly in fig. 3. C represents a collar or circular plate, which is fitted loosely on the hub A, and is secured against the ends of the flanges $a$ by screw-bolts, shown in red. This collar by being screwed up forces the inner ends or tenons of the spokes into the spaces between the flanges, the wedge or taper shape of said flanges causing the spokes to be held firmly in position, and it is designed in practice to have the inner ends or tenons of the spokes of such a width that they will not at first be forced entirely into said spaces, but allow room to admit of the spokes being further forced into the spaces in case of shrinkage. By this arrangement the spokes are effectually prevented from working in any direction. They cannot be forced inward so as to loosen the tire on the wheel, and in case of shrinking they can be tightened by screwing up the collar C.

This invention may be used for double as well as single rows of spokes. For a double row of spokes the hub is cast with two rows of flanges $a$.

Having thus described my invention, I claim as new, and desire to secure by Letters Patent—

A metallic hub for the wheels of vehicles cast with a collar B, having lateral flanges or projections $a$, of the form shown and described, so that the spaces between the flanges which receive the spokes will be of wedge or taper form longitudinally or in a direction parallel with the hub, and of double taper form in a radial direction, in combination with the loose collar C, fitted on the hub and secured to the fixed collar B by bolts, substantially as and for the purpose herein set forth.

JAMES B. STUART.

Witnesses:
SAMUEL BOOTH,
W. F. JOHNSON.